July 21, 1964     F. R. BONHOMME     3,141,723
ELECTRIC COUPLINGS

Filed Jan. 19, 1961     2 Sheets-Sheet 1

INVENTOR.
François Robert Bonhomme
BY
*James W. Dent*
ATTORNEY

July 21, 1964     F. R. BONHOMME     3,141,723
ELECTRIC COUPLINGS

Filed Jan. 19, 1961     2 Sheets-Sheet 2

INVENTOR.
*Francois Robert Bonhomme*
BY
*James H. Dent*
ATTORNEY

United States Patent Office 3,141,723
Patented July 21, 1964

3,141,723
ELECTRIC COUPLINGS
François Robert Bonhomme, Courbevoie, France, assignor to Curtiss-Wright Corporation, a corporation of Delaware
Filed Jan. 19, 1961, Ser. No. 83,659
Claims priority, application France Jan. 20, 1960
6 Claims. (Cl. 339—252)

The present invention relates to electric couplings of the kind comprising two conductive elements adapted to be inserted elastically one into the other, namely a plug and a socket. The most advantageous application of the invention would appear to reside in couplings of the kind referred to, which have small transverse dimensions, namely of the order of 0.6 to 1 mm., and it is to this application that the invention is more particularly, but not exclusively related.

The invention has for its object to provide improvements in such couplings so that they comply better with the various requirements of practice, and especially so that the working stress of the elastic portion of the coupling is small when the coupling is closed.

The invention mainly consists in constituting the first element of a coupling of the kind in question by a tube provided with an approximately longitudinal slot, and by an elastic clip provided with an elongated central portion and two end portions in the form of longitudinally-slit rings. The said clip is held in position in the transverse sense with respect to the tube by contact of the rings with one of the walls of the tube (the outer or inner wall, depending on whether the said elements forms the socket or the plug of the coupling), and in the longitudinal direction by contact of these same rings, for example, with projecting parts of the tube, the central portion of the clip being engaged in the slot so as to project, when at rest, with respect to the other wall of the tube, and in arranging the second element so that it forms a contact wall (inner or outer, depending on whether this second element constitutes the plug or the socket of the coupling) adapted to be engaged on the wall of the tube with respect to which the central portion of the clip projects when at rest, and thus to make an elastic contact with the said central portion.

Apart from this main arrangement, the invention comprises certain other features which will preferably be employed at the same time, and which will be described in further detail below.

The invention contemplates more particularly certain forms of application (to "miniature" circuits) and also certain forms of embodiment of the above-mentioned arrangements, and it includes in its scope, by way of new industrial products, couplings of the kind in question which comprise the application of the said arrangements, the elements and special tools proper to their construction and also installations equipped with such couplings.

The invention will be better understood by means of the further description which follows below with reference to the accompanying drawings, this description and these drawings being understood to be given especially by way of indication.

FIG. 1 of the drawings shows separately in perspective, the clip and the tube forming the socket of a coupling constructed in accordance with a first form of embodiment of the invention.

Figure 8:
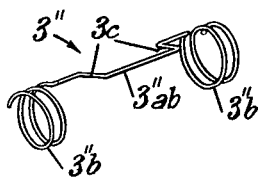
FIG. 8 shows in perspective the clip belonging to a coupling constructed in accordance with a second form of embodiment of the invention.
Figures 9, 10:
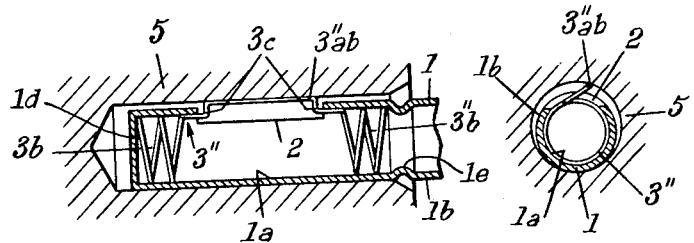

Finally, FIGS. 9 and 10 show in longitudinal and transverse section respectively the complete coupling corresponding to the clip of FIG. 8.

Referring now to the drawings in more detail, the first element of the coupling is constituted by a tube 1 provided with an approximately longitudinal slot 2 and by an elastic clip 3 comprising an elongated central portion 3a and two end portions 3b in the form of loops or rings, the clip 3 being held in the transverse sense with respect to the tube 1 by contact of the loops 3b with one of the walls, the inner wall 1a or the outer wall 1b of the tube, and in the longitudinal sense by contact, for example, of these same loops with projecting parts of the tube, the central portion 3a of the clip being engaged in the slot 2 in such manner as to project, when at rest, with respect to the other wall of the tube, the second element being arranged so as to present a contact wall adapted to be engaged on the wall of the tube with respect to which the central portion 3a of the clip projects when at rest.

Figure 1:
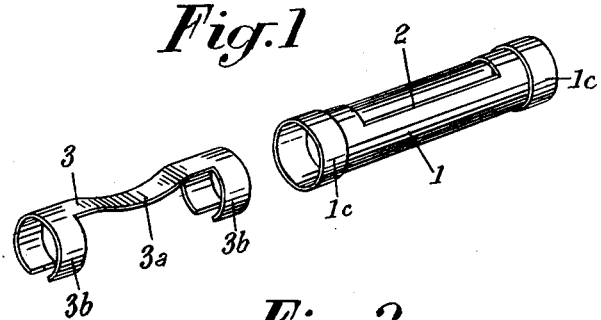
Figure 2:
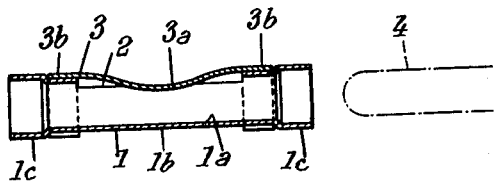
FIG. 2 shows a longitudinal cross-section of the socket unit of FIG. 1, the corresponding plug being shown in chain-dotted lines.

According to the first form of embodiment shown in FIGS. 1 to 7, the first element described above fulfills the function of the socket of the coupling, the latter co-operating with a plug 4 of the usual type shown in FIG. 2. In this case, the clip 3 is arranged round the tube 1 so that its loops 3b are in contact with the outer wall 1b of the tube, and that its central portion 3a projects in the position of rest with respect to the inner wall 1a, as can be seen from FIGS. 2 and 7, the plug 4 thus coming into contact with this central portion when it is engaged in the tube 1.

The clip 3 may be constituted by a thin strip of elastic metal (FIGS. 1 to 3), the loops 3b being each formed for example as clasps by folding two symmetrical arms inwards towards each other, so as to leave between their extremities a free space which facilitates elastic deformation. The clip may also be formed by elastic metal in the form of wire (FIGS. 4 to 7), the loops being formed by one or more turns of this wire. The loops 3b co-operate with projecting portions of the tube 1, constituted for example by small collars 1c, between which the whole of the clip is placed; the central portion 3a may also be terminated by portions 3c substantially at right angles and abutting against the edges of the slot 2 (see FIG. 6).

Figure 3:
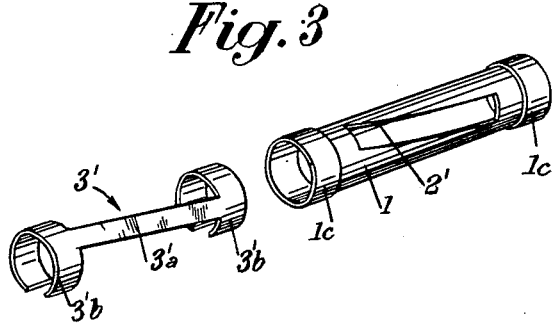
FIG. 3 is a view similar to that of FIG. 1 of the clip and the tube of a coupling constructed in accordance with a first alternative form of embodiment.
Figure 4:
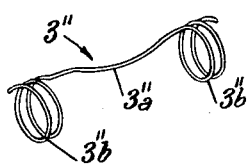
FIGS. 4 and 5 are perspective views of clip members constructed according to modifications of the clip members of FIG. 1 and FIG. 3 respectively.
Figure 5:
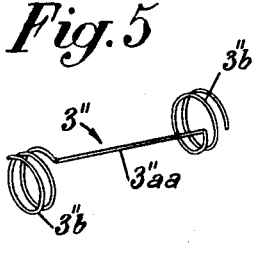
Figure 6:
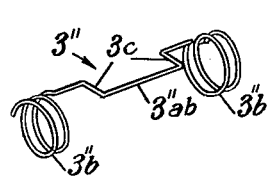
FIGS. 6 and 7 show the clip in perspective and the assembly of the clip and the tube in transverse section of a coupling constructed in accordance with a further modification.
Figure 7:
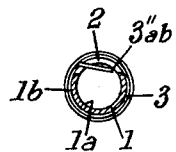

Whether the clip is in sheet metal or of wire, the slot 2 and the corresponding central portion 3a of the clip may both be arranged parallel to the axis of the tube (FIGS. 1, 4 and 6) or they may be inclined with respect to this axis as in FIGS. 3 and 5. In the second case, the central portion 3'a or 3"aa may be straight (FIGS. 3 and 5), since it will then project naturally with respect to the inner wall 1a of the tube 1, whereas in the first case it should be incurved, as in 3"a, FIG. 4, towards the interior so as to be able to form a projection with respect to the said wall, as shown in FIGS. 1 and 2, 4, 6 and 7. When the clip is formed by a wire and the loops are formed by turns, this incurved portion may be designed as shown by 3"ab so that the insertion of the plug 4 tends to unwind these turns and thereby reduces the amount of fatigue, the central portion then being given for that purpose the shape of a crank (FIGS. 6 and 7) and the turns 3″b may be wound in the opposite direction.

In accordance with a second form of embodiment shown in FIGS. 8 and 9, the first element referred to above is caused to function as the plug of the coupling, the latter co-operating with a socket 5 of the usual kind. In this case, the clip 3″ is arranged inside the tube 1 in such manner that the loops 3″b are in contact with the inner wall 1a of the tube, and that the central portion 3″ab projects when at rest with respect to the outer wall 1b, the socket 5 then making contact with this central portion when the tube 1 is inserted in this socket, as shown in FIGS. 9 and 10. The indications given above with respect to the clip described in the first form of embodiment, in which the clip forms part of the socket, are also valid for this second form of embodiment. The loops 3″b may be held against longitudinal displacement by suitable stops or abutments constituted for example at one side by the end wall 1d of the tube and at the other side by an annular shoulder 1e formed on the tube inner wall 1a, as by crimping. The clip also is retained against rotation by engagement of the bent parts 3c with the ends of the slot 2. It will be apparent, FIG. 9, that the portions 3c also tend to hold the clip against longitudinal displacement.

By the means described above, there is obtained an electric coupling, the outer diameter of which is very close to the diameter of the plug, and which may in consequence be reduced to a very low value. The overall size of the plug is thus reduced to the maximum possible extent, which enables, all other things being equal, the mutual insulation of two adjacent couplings to be considerably improved, especially in the case of a connector having a number of pins or plugs.

In addition, the working stress on the coupling is very small since, on the one hand the functions of support and of elastic contact element are carried out by two different members (tube and clip), while on the other hand, the deformation of the clip of this coupling is of very small amplitude and is distributed along a central portion of relatively considerable length.

It will of course be understood from the preceding description that the invention is in no way limited to those methods of application or the forms of embodiment of its various parts which have been more particularly envisaged. On the contrary, the scope of the invention includes all the alternative forms.

What I claim is:

1. An electric coupling of the kind comprising essentially two relatively movable members, a socket member and a plug member adapted to be inserted in said socket member for resilient contact engagement therewith, in which one of said members comprises: a tube provided with an approximately longitudinal slot; an elastic clip having an elongated central portion and two resilient end portions generally circular in form; means for yieldingly retaining said clip transversely on said tube by spring-like circumferential contact of said resilient end portions with one wall of said tube, and longitudinally of said tube by engagement of said end portions with abutment structure forming part of the tube, the clip engaging the tube relative to said slot so that said central portion of the clip projects when the coupling is open, through said slot, and a contact surface formed on the other coupling member and adapted to be engaged by the aforesaid central clip portion so as to establish resilient coupling contact between the aforesaid other coupling member and said central clip portion.

2. An electric coupling as claimed in claim 1, in which said tube constitutes the socket member of said coupling, said clip being disposed on said tube in such manner that the resilient end portions form clasps that circumferentially grip the outer wall of said tube, and that said central clip portion projects, when the coupling is open, through the slot and into said tube, said second-mentioned member being a conventional pin-plug adapted to make resilient contact with said central clip portion when the plug is inserted in said tube.

3. An electric coupling as claimed in claim 1, in which said tube constitutes the plug member of said coupling, said clip being disposed inside said tube in such manner that the resilient end portions are in frictional contact with the inner wall of said tube, and that said central clip portion projects, when the coupling is open, through the slot to the exterior of said tube, said second-mentioned member being a conventional socket adapted to make resilient contact with said central clip portion when said tube is inserted in said socket.

4. An electric coupling as claimed in claim 1, in which said clip is constituted by a strip of elastic metal shaped to the form of an H, each of said end portions being formed by bending back the two symmetrical transverse arms until their extremities are close together.

5. An electric coupling as claimed in claim 1, in which said clip is constituted by elastic metallic wire, said end portions being formed by at least one spiral turn of said wire at each extremity of said clip.

6. An electrical connector of the plug-in type having co-acting socket and plug contacts, the socket contact comprising a tube having an elongated slot extending generally along and at an angle to the tube's longitudinal axis, a spring-like member arranged to be mounted on said tube and formed by a pair of spaced resilient clasps that are interconnected by a pre-formed resilient contact strip extending along a line corresponding to the slot angle, said member being carried by the tube so that said contact strip fits within said slot and a preformed central portion thereof extends through the slot and tube wall for spring engagement with the plug contact, said clasps being adapted for circumferential clamping engagement with the corresponding end parts of the tube wall for holding said member in position, and said tube having restraining means forming abutments at said clasps for preventing longitudinal movement of said member in either direction.

References Cited in the file of this patent

UNITED STATES PATENTS

| | | |
|---|---|---|
| 2,325,691 | Litwin et al. | Aug. 3, 1943 |
| 2,716,744 | Swanson et al. | Aug. 30, 1955 |
| 2,900,631 | Love | Aug. 18, 1959 |
| 2,946,026 | Rollefson | July 19, 1960 |
| 3,029,411 | Majewski | Apr. 10, 1962 |

FOREIGN PATENTS

| | | |
|---|---|---|
| 881,186 | France | Jan. 15, 1943 |
| 886,954 | France | July 26, 1943 |
| 1,034,909 | France | Apr. 15, 1953 |
| 1,228,728 | France | Mar. 14, 1960 |
| 379,115 | Germany | Aug. 14, 1923 |
| 734,112 | Germany | Apr. 8, 1943 |
| 643,627 | Great Britain | Sept. 20, 1950 |